July 19, 1949.  W. W. WISEMAN ET AL  2,476,343
FREQUENCY DISPLACEMENT
Filed Dec. 13, 1940
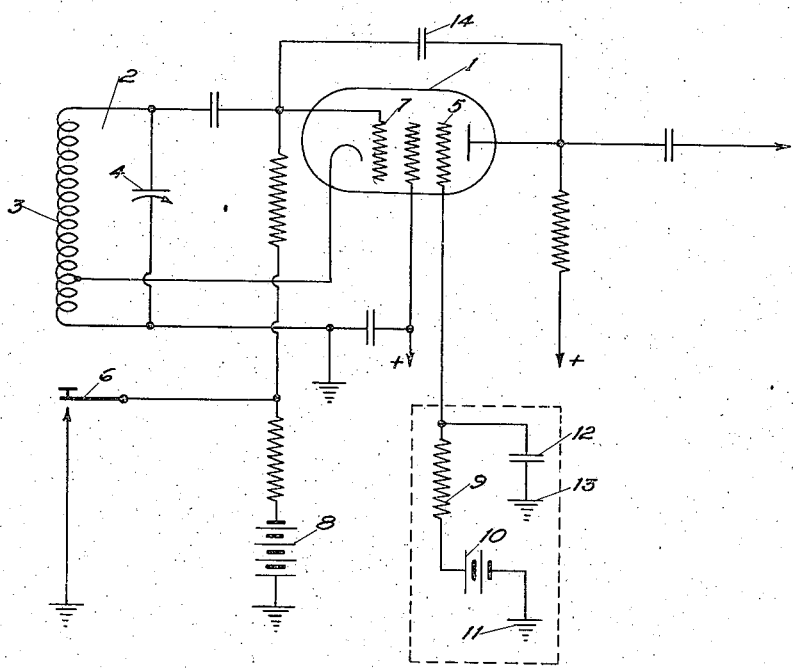
INVENTORS
William W. Wiseman
Russell B Wright
BY
ATTORNEY Patented July 19, 1949

2,476,343

UNITED STATES PATENT OFFICE 2,476,343

FREQUENCY DISPLACEMENT

William W. Wiseman and Russell B. Wright, Washington, D. C.

Application December 13, 1940, Serial No. 370,028

6 Claims. (Cl. 250—17)

(Granted under the act of March 3, 1883, as amended April 30, 1928; 370 O. G. 757)

This invention relates to a means for automatically displacing the frequency of a transmitter over a predetermined range during a keying interval.

Such a means is particularly useful in echo-ranging systems wherein a signal is sent from a transmitter forming part of the system and its echo is received by a receiver tuned to the frequency of the transmitter.

When echo-ranging against a moving target there is a frequency displacement of the echo compared to the outgoing signal which is called the Doppler effect. The displacement may be up or down depending upon the relative motions of the ship and target. For a Doppler effect, the echo therefore might fall outside the band width of a very sharply tuned receiver which was tuned to the same frequency as the transmitter. If however, the transmitting frequency is displaced during the keying interval by an amount as great as the Doppler effect some portion of the echo must fall exactly on the frequency to which the receiver is tuned. When used with a broad intermediate frequency band receiver, such frequency displacement gives the target echo a particular frequency characteristic which enables the operator better to distinguish it from other echoes or through interference. Also, when used with a very sharply tuned projector to which the transmitter is approximately tuned, it assures that the driver frequency will coincide exactly with resonance frequency of the projector at some time during the keying interval.

It is an object of this invention to provide a simple means for automatically producing such a frequency displacement in the output of a transmitter over a predetermined frequency range, during a keying interval.

In the drawing the single figure is a diagrammatic showing of a circuit embodying the invention.

The reference numeral 1 indicates an oscillator forming part of the signal source of a transmitter. Its frequency is partially governed by the characteristics of the tuned circuit 2 comprising inductance 3 and capacity 4. However, the frequency of an oscillating circuit of the type shown is determined by the LCR values of the circuit and by the tube constants. The tube constants however are affected by the potentials applied to its elements, which thus affect the frequency. By causing the potential on the suppressor grid 5 of the fixed oscillator continuously to change in the same direction during the keying interval, the tube constants are correspondingly changed so as to cause a frequency displacement in the desired direction and amount without materially affecting the other properties of the oscillator.

With the key 6 open the control grid 7 is normally maintained at a sufficiently negative potential by means of battery 8 as to block the tube. The suppressor grid 5 is connected through resistance 9 to the positive side of battery 10, the other side of which is grounded at 11. Connected between the grid 5 and resistance 9 is a branch containing condenser 12 and terminating in a ground at 13.

While the key 6 remains open the condenser 12 is charged to a small positive voltage above ground by battery 10. When the key is closed the control grid immediately loses its negative bias permitting cathode current to flow. The suppressor grid being rendered positive by the above ground charge on condenser 12 increases the plate current above its normal value. The condenser 14 shown connected between plate and control grid may be the internal capacity between plate and control grid. The positive potential of the suppressor at the start of the keying interval reduces the resistance between plate and cathode and thus increases the capacity between the control grid and ground. This has the effect of initially lowering the frequency of the tuned circuit 2.

The charge on condenser 12 will be gradually neutralized by the suppressor grid current and as this occurs the resistance between plate and cathode will increase while the capacity between the control grid and the ground will decrease. Thus the frequency will rise, become normal when the suppressor potential is zero, and continue to rise as the condenser 12 is charged negatively until the suppressor grid current through resistance 9 creates an IR drop equal to the potential of the suppressor below ground plus the battery potential.

Alternating voltage of oscillation frequency is impressed on the suppressor grid circuit network through "electron coupling" similar to the manner in which voltage is induced in the plate circuit, and also through inter-electrode capacitative coupling to the plate circuit. Due to the presence of this voltage and to the non-linearity in the internal suppressor grid resistance, rectification takes places, with the result that the suppressor grid becomes more negative with respect to ground in an amount equal to the product of the direct component of the grid current and the external resistance in the suppressor grid circuit network.

The change in the suppressor grid bias thus caused, results in a different value of screen grid internal resistance, and hence, because the screen grid acts as the anode of the oscillator circuit network, causes the frequency of oscillation to be changed. The amount of frequency displacement thus caused, and the length of the time interval during which this displacement is brought about, are functions of the voltage induced on the suppressor grid, of the internal characteristics of the vacuum tube, and of the circuit parameters external to this tube, but principally of the external elements in the suppressor grid circuit network.

The action may be summed up as follows: For any set of conditions, and a given mode of oscillation, there is an equilibrium value of internal vacuum tube plate resistance required for sustained or steady-state oscillation. As the oscillator reaches stable equilibrium its frequency changes from its transient or starting value to its required steady-state value. Normally the time required to reach equilibrium is quite small. If, however, a large time constant is added in one of the grid circuits, the time to each equilibrium may be increased. If a large time constant circuit is inserted in the suppressor grid circuit, the amplitude of frequency displacement, and the interval required for this displacement may be controlled conveniently. In our system the oscillator amplitude rises very rapidly to a value which would correspond to its steady-state value if there were no resistance external to the suppressor grid. Then the suppressor grid begins to accumulate a more negative bias with respect to ground. The time interval required for the suppressor grid circuit substantially to reach equilibrium value is, neglecting the internal tube impedances, governed by its time constant. This time constant is a function of the resistance and capacitance in this circuit network.

In this system neither the magnitude nor the rate of the frequency displacement is dependent on the supersonic frequency. Obviously both the magnitude and the rate of displacement are subject to certain limitations, but it has been determined experimentally that it is practical to obtain a displacement sufficient to cover the Doppler effects occurring in service.

While the disclosure of this invention has been confined to one embodiment thereof, it is to be understood that the invention is not to be limited thereby but only by the scope and limitations of the appended claims.

The invention described herein may be manufactured and/or used by or for the Government of the United States of America for governmental purposes without the payment of any royalties thereon or therefor.

We claim:

1. In a transmitter utilizing an oscillator as a signal source, said oscillator comprising a pentode tube and a tuned circuit therefor, the pentode including a suppressor grid, means for keying the oscillator to change it from an unkeyed non-oscillating state to an oscillating state, means for displacing the frequency of said oscillator over a pre-determined range during a keying interval, said means comprising a condenser connected between the suppressor grid of said tube and ground, and means for charging said condenser to a small positive potential above ground while said transmitter is in an unkeyed state.

2. In a transmitter utilizing a fixed oscillator as a signal source, said oscillator comprising a pentode tube and a tuned circuit therefor, the pentode including a suppressor grid, means for keying the oscillator to change it from an unkeyed nonoscillating state to an oscillating state, means for displacing the frequency of said oscillator over a pre-determined range during a keying interval, said means comprising means for applying to the suppressor grid of said pentode tube a pre-determined positive potential above ground while said transmitter is in an unkeyed state and means in the external circuit of said suppressor grid causing a predetermined negative swing of the potential thereof during a keying interval.

3. In a transmitter utilizing a fixed oscillator as a signal source, said oscillator comprising an electron tube having a control grid and a tuned circuit, means for displacing the frequency of said oscillator over a pre-determined range during a keying interval, comprising means for producing a sustained and progressive variation over a pre-determined range in the capacity between the control grid of said tube and ground during said keying interval.

4. In a transmitter using an oscillator as a signal source, said oscillator comprising a pentode tube having a suppressor grid and a tuned circuit, means for keying said oscillator means for progressively changing the frequency of said oscillator over a predetermined range, said means comprising means for varying the potential of the suppressor grid.

5. In a transmitter utilizing a fixed oscillator as a signal source, said oscillator comprising a multi-grid electron tube driven by a tuned circuit, means supplying a given equilibrium value of potential on a grid of said tube for maintaining an equilibrium value of internal tube plate-resistance required for sustained or steady state oscillation, means for keying the oscillator, means for displacing the frequency of said oscillator over a predetermined range during a given keying interval comprising means for maintaining on said grid a predetermined positive potential different from said equilibrium value while said transmitter is in an unkeyed state and means extending over a desired time interval the swing of potential of said grid from said predetermined positive potential to said equilibrium value.

6. In a transmitter utilizing a fixed oscillator as a signal source, said oscillator comprising a multi-grid electron tube driven by a tuned circuit, means supplying a given equilibrium value of potential on a grid of said tube for maintaining an equilibrium value of internal tube plate-resistance required for sustained or steady state oscillation, means for keying the oscillator, means for displacing the frequency of said oscillator over a predetermined range during a given keying interval comprising means for maintaining on said grid a predetermined positive potential different from said equilibrium value while said transmitter is in an unkeyed state, an external circuit for said grid and means imparting to said circuit a time constant of sufficient value to extend to a desired value the time required for the swing of the potential of said grid back to its equilibrium value.

WILLIAM W. WISEMAN.
RUSSELL B. WRIGHT.

REFERENCES CITED

The following references are of record in the file of this patent:

UNITED STATES PATENTS

| Number | Name | Date |
|---|---|---|
| 2,082,935 | Armstrong | June 8, 1937 |
| 2,349,885 | Roberts | May 30, 1944 |

FOREIGN PATENTS

| Number | Country | Date |
|---|---|---|
| 380,144 | Great Britain | Sept. 15, 1932 |